United States Patent [19]

Botnick

[11] 4,227,548
[45] Oct. 14, 1980

[54] MULTIPLE CONTROL VALVE FOR MIXING FLUIDS

[76] Inventor: Irlin H. Botnick, 3155 Kersdale, Pepper Pike, Ohio 44114

[21] Appl. No.: 15,813

[22] Filed: Feb. 27, 1979

[51] Int. Cl.³ .............................................. F16K 19/00
[52] U.S. Cl. .................... 137/606; 137/628; 137/630.19
[58] Field of Search .......... 137/606, 607, 628, 630.19, 137/630.2, 630.22; 4/192, 193, 194; 251/210

[56] References Cited

U.S. PATENT DOCUMENTS

| | | | |
|---|---|---|---|
| 2,453,409 | 11/1948 | Chace | 137/606 X |
| 3,047,014 | 7/1962 | Kovach | 137/607 |
| 3,348,019 | 10/1967 | Miller | 137/606 X |
| 3,370,609 | 2/1968 | Botnick | 137/607 |
| 3,468,344 | 9/1969 | Sanford | 137/607 X |
| 3,536,097 | 10/1970 | Caparone | 137/606 X |
| 3,603,349 | 9/1971 | Botnick | 137/606 X |
| 3,750,701 | 8/1973 | Botnick | 137/606 |
| 4,178,964 | 12/1979 | Moore | 137/606 X |

FOREIGN PATENT DOCUMENTS 1190051  10/1959  France ...................... 137/607

*Primary Examiner*—Robert G. Nilson
*Attorney, Agent, or Firm*—Burge & Porter Co.

[57] ABSTRACT

A mixing valve particularly suited for use as a water faucet includes separate finger-operated lever controls for selectively delivering an unmixed flow of cold water, an unmixed flow of hot water, and one or more mixed flows of intermediate temperature water. An intermediate temperature flow is obtained by combining and mixing separate flows of cold and hot water in a mixing chamber. A temperature selection lever is provided for positioning a flow restriction element to control the relative proportion of the flows of cold and hot water delivered to the mixing chamber so that any desired intermediate temperature can be selected for the mixed flow delivered from the mixing chamber. Constant temperature of a mixed flow is maintained throughout the available range of flow rates in part by coordinating the admittance of cold and hot flows to the mixing chamber with respect to the discharge of mixed fluid from the mixing chamber so that suitable back pressure is maintained in the mixing chamber. A stacked array of layer elements defines the valve's housing and provides an inexpensive cartridge which can be replaced as a unit in the event service is needed.

32 Claims, 12 Drawing Figures

MULTIPLE CONTROL VALVE FOR MIXING FLUIDS

CROSS-REFERENCE TO RELATED PATENT

SELECTABLE TEMPERATURE MIXING VALVE, U.S. Pat. No. 3,750,701 issued Aug. 7, 1973 to Irlin Botnick, here the "Mixing Valve Patent," the disclosure of which is incorporated herein by reference.

BACKGROUND OF THE INVENTION

1. Field of the Invention

The present invention relates generally to a mixing valve, and more particularly, to a variable flow mixing valve especially well suited for use as a water faucet wherein either of two fluids may be delivered independently, or the two fluids may be mixed in preselected proportions for delivery.

2. Prior Art

Various forms of so-called mixing valves or faucets incorporating mixing valves have been developed for residential and other uses to deliver either of two fluids independently or to mix two fluids for delivery. Valves of this type are ordinarily used to deliver water at cold or hot supply temperatures, or at one or more intermediate temperatures, and at flow rates chosen by the user.

Early mixing valves consisted essentially of cold and hot water valve structures actuated by independent controls, but discharging jointly through a common spout. These dual control valves do not perform an internal mixing function but rather simply discharge regulated flows of cold and hot water through a common spout. A certain amount of skill is required by the user to independently adjust the dual flow controls to deliver water at a desired flow rate and at a desired temperature. Delivering water at a constant intermediate temperature throughout a range of available flow rates has been virtually impossible utilizing these early dual control valves.

More recently, mixing valves employing a single control have been developed. These single control valves typically provide a manually operable lever which is movable in one mode to deliver water at a selected temperature, and in another mode to provide a desired flow rate. Just as dual control valves require a certain amount of operator skill to effect delivery of water at a desired temperature and flow rate, these improved single control valves likewise require a certain amount of operator skill to effect the desired operation. Trial and error positioning of the control is often required to obtain a mixed flow of desired temperature. Those who are unfamiliar with the operation of a particular single control valve often find a substantial amount of trial and error positioning of its control is needed to achieve the desired delivery rate and temperature.

The referenced Mixing Valve Patent presents a further advance in mixing valve art. In the type of mixing valve described in this Patent, separate finger-operated controls are provided for supplying unmixed flows of cold and hot water. Additionally, one or more finger-operated controls are provided for supplying one or more mixed flows at a preselected intermediate temperature or temperatures. By this arrangement, each of the finger-operated controls regulates the delivery of water at a different delivery temperature. Delivery flow rate is established by positioning the proper control along its path of movement. Selection of the intermediate temperature or temperatures is effected by setting one or more flow restriction controls to properly proportion the relative rates of flow of cold and hot water which are supplied to each mixing chamber.

A "trickle flow" approach is described in the referenced Mixing Valve Patent for maintaining a constant temperature delivery of mixed water throughout an available range of flow rates. A primary valve element controls the admission of separate flows of cold and hot water to a mixing chamber. A secondary valve element regulates the flow of mixed fluid from the mixing chamber. The secondary valve element is described as never closing completely and as functioning in concert with the primary valve element to assure the presence of a properly stabilized flow through the mixing chamber. The approach described in the referenced Mixing Valve Patent has been improved upon through the development of the present invention.

While the arrangement described in the referenced Mixing Valve Patent provides a rather easily serviceable unit which is producible as a durable structure at comparatively low cost, it does not provide a low cost operational "cartridge" which can be disposed of and readily replaced in the event the valve requires service.

A problem not addressed by the Mixing Valve Patent is deterioration of the secondary valve element due to repeated flexures. Moreover, some of the parts of the valve structure of the referenced Mixing Valve Patent have been found to require more complex fabrication techniques than was initially thought necessary.

Still another problem not addressed by the referenced Mixing Valve Patent is the need to provide for ease of adjusting the predetermined temperature or temperatures of the mixed flow or flows through a wide range of temperatures without having to remove a decorative cover or to utilize tools.

SUMMARY OF THE INVENTION

The present invention overcomes the foregoing and other drawbacks of prior art proposals by providing a novel and improved, multiple control mixing valve having a housing which is formed inexpensively as a stacked array of layer elements. An improved valving arrangement is provided for maintaining mixing chamber back pressure to assure a constant temperature output throughout a range of available flow rates. Moreover, the valve is provided with a readily accessible finger-operated control or controls for selecting the delivery temperatures of one or more mixed flows.

In accordance with the preferred practice of the present invention, a mixing valve has a cartridge-like housing formed as a stacked array of layer elements. The layer elements cooperate to define several overlying valve stages. A first stage is provided wherein (1) a flow of cold water is divided into at least two flow paths, (2) a flow of hot water is similarly divided into at least two flow paths, and (3) an adjustable restriction element is provided for controlling the flow rate along at least one of the cold and/or hot water flow paths.

Unrestricted flows of cold and hot water are delivered from the first stage to a second stage where separate lever-operated valve elements selectively control the admission of separate cold and hot flows directly to an outlet chamber located in a fourth stage. Proportioned flows of cold and hot water are delivered from the first stage to the second stage where one or more primary valve elements control the admission of these flows to one or more third stage mixing chambers. A separate secondary valve element controls discharge of mixed fluid from each of the third stage mixing chambers to the fourth stage outlet chamber.

A significant feature of the invention lies in the provision of a lost-motion or time delay mechanism operably interconnecting each set of primary and secondary valve elements to assure that a brief time interval lapses after the primary valve element opens before mixed fluid is permitted to discharge from the associated mixing chamber. Each of the lost-motion or time delay systems is designed such that desired back pressure is maintained in its associated mixing chamber to assure constant temperature delivery throughout the available range of flow rates.

Three types of lost-motion or time delay systems for maintaining mixing chamber back pressure are described. In all of these embodiments, an elastomeric boot overlies an outlet chamber and is engaged by a plunger element which exerts force through the boot to control the positioning of a set of primary and secondary valve elements. In the preferred embodiment, the elastomeric boot has a tubular depending part which forms a valve seat about an upwardly extending stem portion of the primary valve element. The tubular depending portion assists in defining a restricted outlet opening for controlling the discharge of mixed fluid from the mixing chamber and to thereby maintain proper back pressure within the mixing chamber.

The layered structural arrangement of the valve housing permits relatively complexly configured flow paths and the like to be provided within the housing at minimal fabrication cost. The individual layer elements of the housing preferably take the form of thin, plate-like laminae, each of which is molded, relatively inexpensively, from suitable plastics material such as nylon, high density polyethylene, or the like. The layer elements can be formed with adequate dimensional accuracy through techniques such as injection molding. The layer elements can be assembled, quite easily, by stacking, one atop the other, with the necessary seals and other operating components sandwiched therebetween and housed therein.

In the event certain of the components housed within the stacked array of layer elements should require service, the entire cartridge-like stacked array of layer elements is sufficiently inexpensive that it can be disposed of and replaced with a new cartridge rather than to be disassembled and serviced. This disposable feature of the operational section of the valve is a significant feature in consumer acceptance of the valve.

Still another feature of the invention lies in the ease with which the selected intermediate temperature or temperatures of one or more mixed fluids can be adjusted. A lever-operated cam is provided for adjustably positioning a flow restriction member to proportionately regulate flows of cold and hot water which are admitted to each mixing chamber. The temperature adjustment lever or levers are accessible from the back of the valve and do not require removal of a valve cover or the use of tools for adjustment.

These and other features and advantages, and a fuller understanding of the invention may be had by referring to the following description and claims, taken in conjunction with the accompanying drawings.

DESCRIPTION OF THE PREFERRED EMBODIMENT

Figure 1:
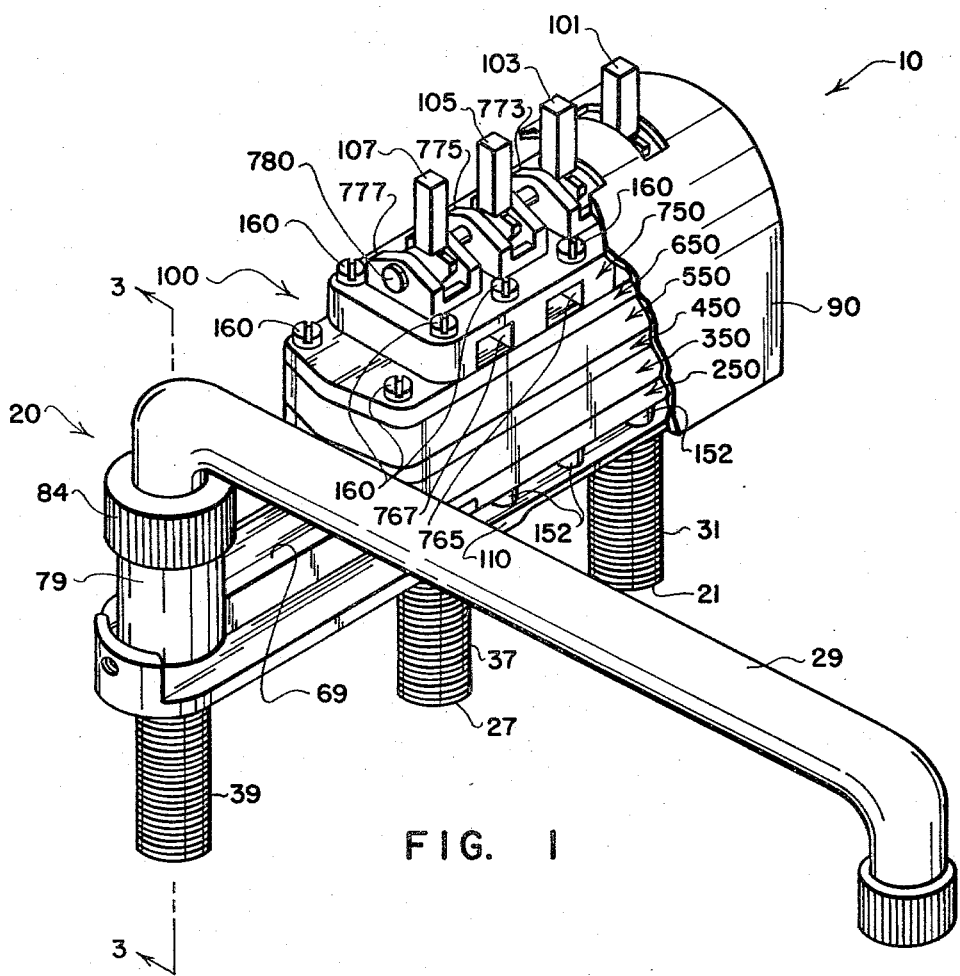
FIG. 1 is a perspective view of a faucet assembly including a mixing valve embodying the preferred practice of the present invention, the faucet assembly having a portion of its outer protective cover broken away to permit underlying parts to be viewed.

Referring to FIGS. 1-4, a faucet assembly is indicated generally by the numeral 10. The faucet assembly 10 is of a type intended for use in residential or commercial environments to selectively supply an unmixed flow of cold water, an unmixed flow of hot water, or various mixed flows of cold and hot water.

The faucet assembly 10 principally includes a water distribution structure 20 and a mixing valve cartridge 100. The structure 20 defines a cold water inlet 21, a hot water inlet 27, and a spout-type water outlet 29. The mixing valve cartridge 100 includes control levers 101, 103, 105, 107 for selectively regulating flows of cold and hot water from the inlets 21, 27 to the outlet 29. The valve 100 utilizes temperature adjustment levers 113, 115 which are mounted on the structure 20 to selectively regulate the temperatures of such mixed fluid outlet flows as are provided through actuation of the control levers 103, 105. A cover 90 encloses upper portions of the valve cartridge 100 together with upper portions of the structure 20.

In order that the reader may more easily understand the description which follows, reference numerals have been assigned in an organized manner to various components of the assembly 10. All components designated by numerals ending with the digit "1" are associated with the flow of cold water from the cold water inlet 21, the flow rate of which is regulated by the lever 101. All components designated by numerals ending with the digit "3" are associated with the establishment of a mixed, lukewarm flow, the flow rate of which is regulated by the lever 103, and the temperature of which is controlled by the position of the lever 113. All components designated by numerals ending with the digit "5" are associated with the establishment of a mixed, warm flow, the flow rate of which is regulated by the lever 105, and the temperature of which is controlled by the position of the lever 115. All components designated by numerals ending with the digit "7" are associated with the flow of hot water from the hot water inlet 27, the flow rate of which is regulated by the lever 107. Lastly, all components designated by numerals ending with the digit "9" are associated with the flow of water to and through the outlet 29.

Figure 2:
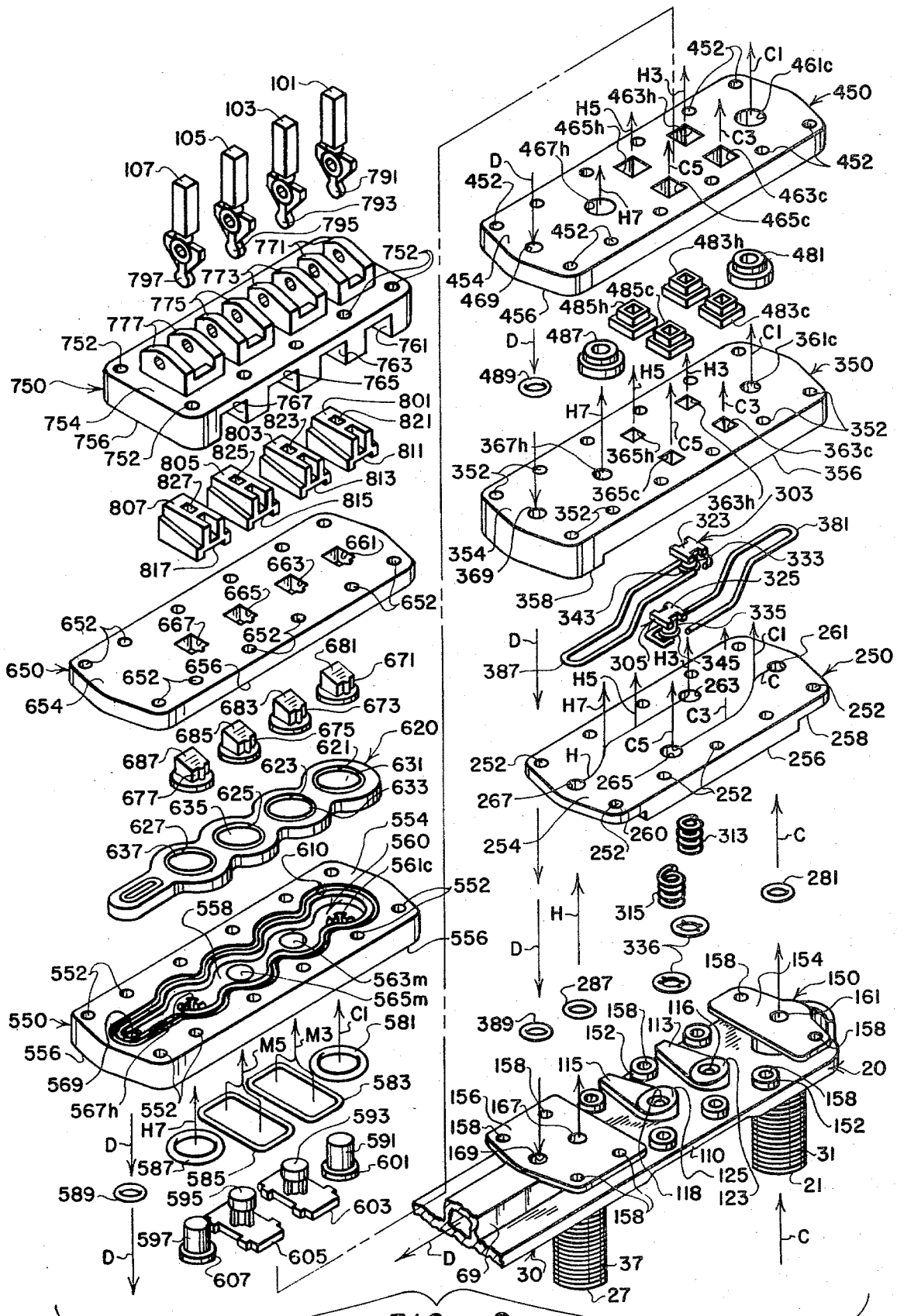
FIG. 2 is an exploded perspective view showing major elements of the mixing valve of FIG. 1.
Figure 3:
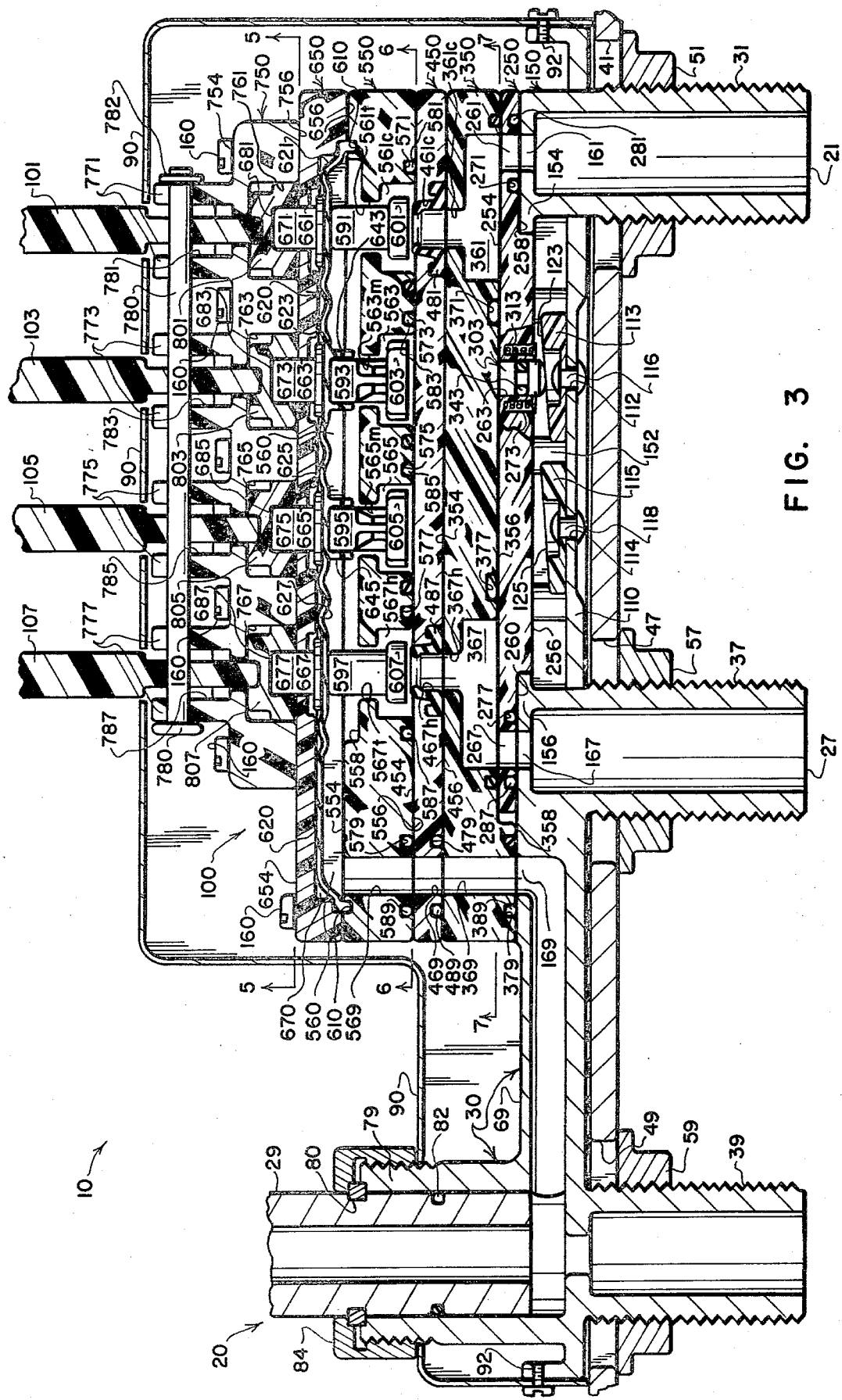
FIG. 3 is an enlarged sectional view as seen from a plane indicated by a line 3—3 in FIG. 1.
Figure 4:
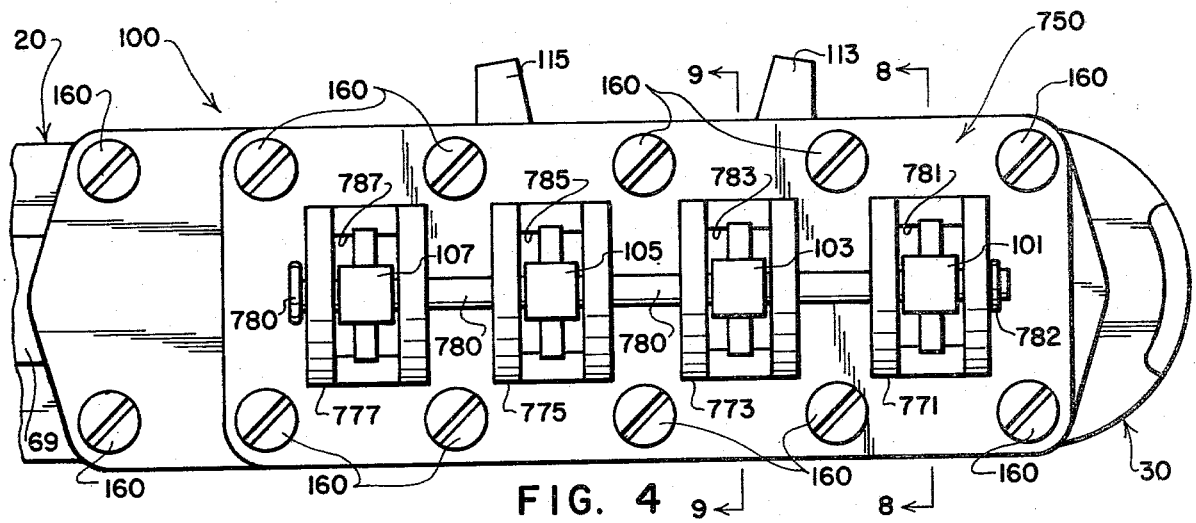
FIG. 4 is an enlarged top plan view of a portion of the mixing valve of FIG. 1 with the protective cover removed.
Figure 5:
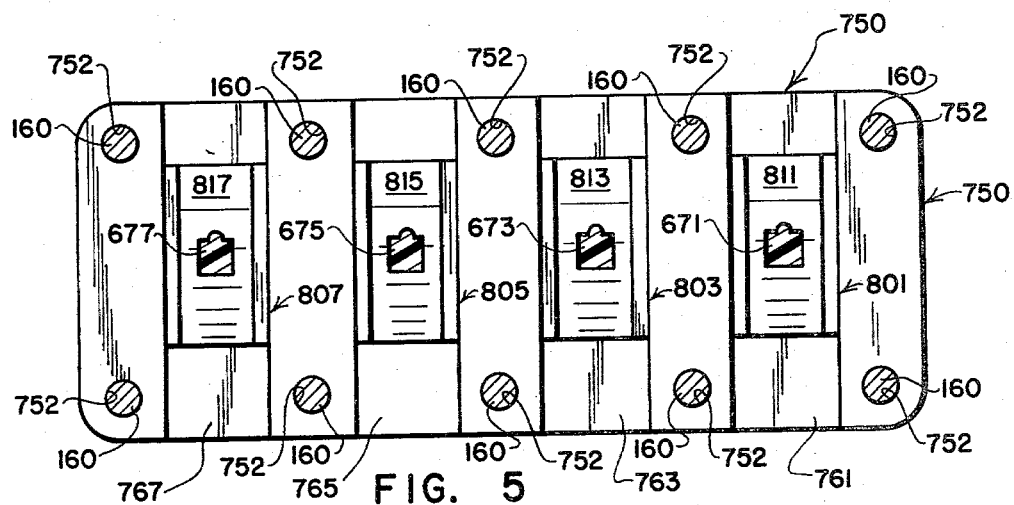
FIGS. 5, 6 and 7 are sectional views as seen substantially from planes indicated by lines 5—5, 6—6, and 7—7 in FIG. 3.

Referring to FIGS. 1-3, the distribution structure 20 includes a one-piece brass casting 30. The inlets 21, 27 are formed as integral depending parts 31, 37 of the casting 30. An additional depending part 39 is formed as an integral part of the casting 30. All three of the depending parts 31, 37, 39 are of tubular configuration and have threaded outer surfaces. Cold and hot water supply line connections (not shown) may be threaded onto the parts 31, 37 to communicate the inlets 21, 27 with pressurized sources of cold and hot water. A hose connection (not shown) may be threaded onto the part 39 to channel outlet water to a sink supply hose (not shown) of the type commonly used with kitchen sink installations.

The parts 31, 37, 39 serve as a means for mounting the faucet assembly 10 on a sink or countertop. Referring to FIG. 3, the parts 31, 37, 39 may be extended through sink or countertop openings 41, 47, 49 and are secured in place by threaded nuts 51, 57, 59.

The casting 30 has a leftwardly extending portion, as viewed in FIGS. 1-3, which defines an outlet conduit 69. The outlet conduit 69 has an upwardly extending left end region 79. One end of the outlet spout 29 extends into the left end region 79. As is seen in FIG. 3, a metal snap ring 80 and a resilient O-ring 82 extend around the perimeter of the outlet spout 29. A nut 84 is threaded onto the upstanding left end region 79 and serves to clamp the snap ring 80 into snug engagement with the upstanding end region 79. The O-ring 82 prevents leakage between the spout 29 and the upstanding end region 79. By this arrangement, a pivotal connection is established between the spout 29 and the outlet conduit 69.

The cover 90 is formed from a corrosion resistant material. Threaded fasteners 92 may be used to secure the cover 90 to opposite ends of the casting 30. Alternatively, the cover 90 may be configured such that, when the nut 84 is tightened in place, it serves to clampingly retain the cover 90 in position.

Referring to FIGS. 2 and 3, the temperature adjustment levers 113, 115 are mounted on the casting 30. The casting 30 has a generally flat web 110 which extends between and connects the cold and hot water inlets 21, 27. A pair of holes 112, 114 are formed through the web 110. A pair of rivets 116, 118 extend through the holes 112, 114 and serve to pivotally mount the temperature regulation levers 113, 115 on the web 110. The levers 113, 115 carry upwardly facing inclined cam surfaces 123, 125. As will be explained in greater detail, when the levers 113, 115 are pivoted about their mounting rivets 116, 118, the cam surfaces 123, 125 operate a pair of flow restrictor elements 303, 305.

The casting 30 has several upwardly extending formations which define a base stage or first layer element 150 for mounting the mixing valve cartridge 100. Six bosses 152 project upwardly from front and rear sides of the web 110. A pair of mounting pads 154, 156 project upwardly from the inlet structures 31, 37 and overlie opposite ends of the web 110. Threaded holes 158 are provided in the bosses 152 and in the pads 154, 156. Threaded fasteners 160, best seen in FIGS. 1 and 4, extend through the valve assembly 100 and are threaded into the holes 158 to secure the valve cartridge 100 in place on the casting 30 at a position atop the bosses and pads 152, 154, 156.

A cold water supply port 161 opens upwardly through the pad 154 and communicates with the cold water inlet 21. A hot water supply port 167 opens upwardly through the pad 156 and communicates with the hot water inlet 27. An outlet port 169 opens upwardly the pad 156 and communicates with the outlet conduit 69.

Referring to FIGS. 2 and 3, the valve cartridge 100 includes a stacked array of second, third, fourth, fifth, sixth and seventh layer elements, 250, 350, 450, 550, 650, 750. These layer elements have aligned holes 252, 352, 452, 552, 652, 752 formed therethrough to receive the threaded fasteners 160. When the fasteners 160 are inserted through these aligned holes and are threaded into the holes 158 formed in the casting 30, the fasteners 160 serve to clampingly retain the cartridge 100 in position atop the first layer element 150.

The second layer element 250 is of generally rectangular configuration, having a planar top surface 254, a centrally located planar bottom surface portion 256, and a pair of planar bottom end surface portions 258, 260. The end surface portions 258, 260 are configured to mount atop the pads 154, 156, respectively. The bottom central portion 256 is configured to depend between the pads 154, 156 and to closely overlie the temperature control levers 113, 115.

Referring to FIGS. 2 and 3, a cold water passage 261 opens downwardly through the bottom end portion 258 and upwardly through the top surface 254. The passage 261 aligns with the cold water inlet supply port 161. A hot water passage 267 opens downwardly through the bottom end portion 260 and upwardly through the top surface 254. The passage 267 aligns with the hot water inlet supply port 167. A pair of downwardly opening annular grooves 271, 277 are formed about the lower ends of passages 261, 267. A pair of O-rings 281, 287 are positioned in the grooves 271, 277 and serve to sealingly communicate the passages 261, 267 with the ports 161, 167.

Figure 9:
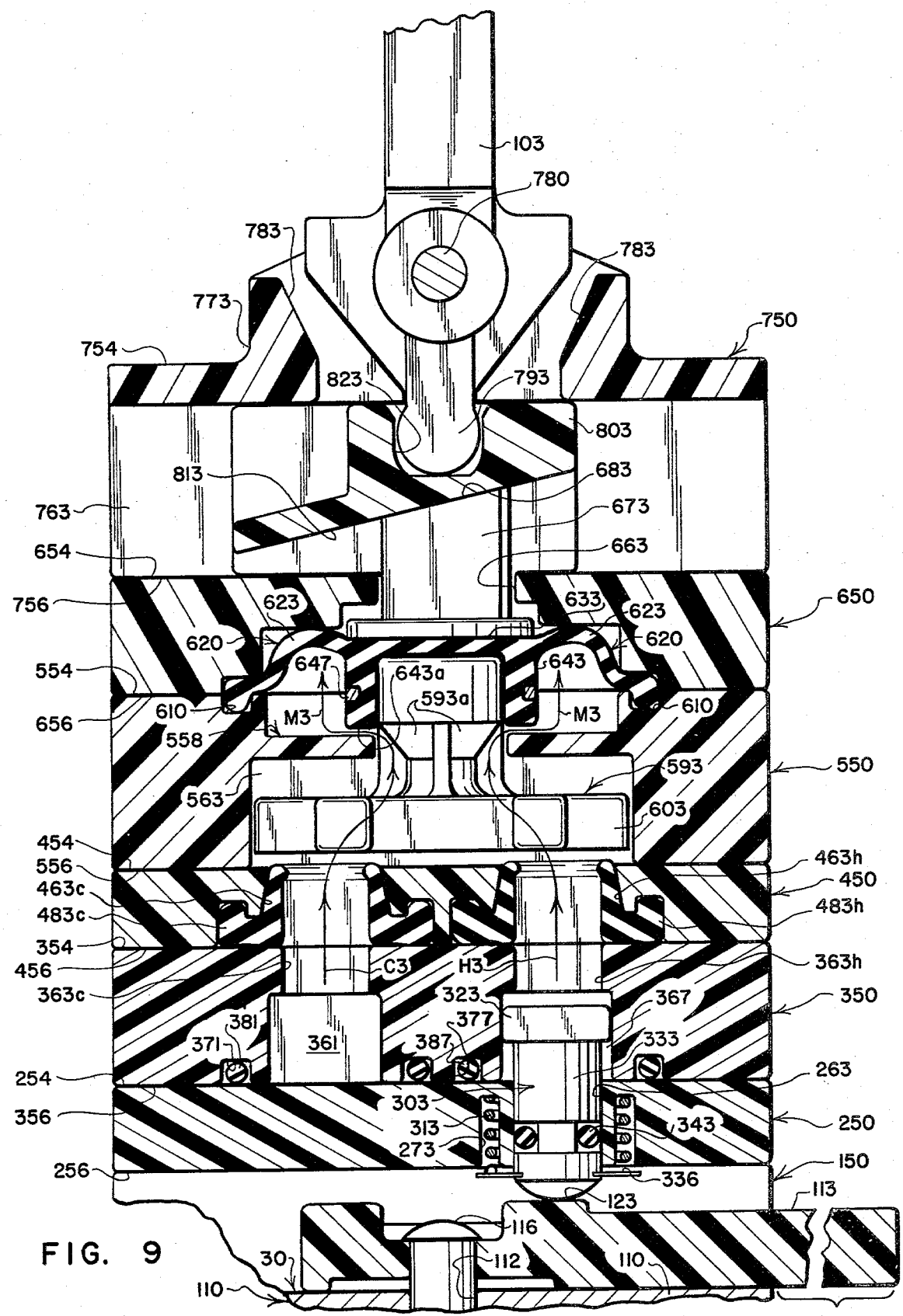

A pair of mounting passages 263, 265 open downwardly through the central portion 256 and upwardly through the top surface 254. The mounting passages 263, 265 overlie the temperature control levers 113, 115. As is best seen in FIGS. 3 and 9, a downwardly opening annular groove 273 is formed in the central portion 256 coaxially about the lower end of the mounting passage 263. An identical annular groove (not shown) is provided about the lower end of the mounting passage 265.

A pair of flow restrictor elements 303, 305 are carried in the mounting passages 263, 265. A compression coil spring 313 is carried in the groove 273. A compression coil spring 315 is carried in a corresponding groove surrounding the lower end of the element 305. The flow restrictor elements 303, 305 are identical one with another. The elements 303, 305 have enlarged, generally H-shaped upper end regions 323, 325 and generally cylindrical lower end regions 333, 335 each of which carries a spring steel washer 336. The lower end regions 333, 335 are slidingly received within the mounting passages 263, 265, and carry O-rings 343, 345 to prevent fluid leakage through the mounting passages 263, 265. The springs 313, 315 engage the washers 336 and bias the lower end regions 333, 335 of the restrictor elements 303, 305 downwardly into engagement with the cam surfaces 123, 125 provided on the temperature regulation levers 113, 115. By adjusting the levers 113, 115, the height to which the H-shaped upper end regions 323, 325 project above the top surface 254 is controlled.

The third level element 350 is of generally rectangular configuration, having a length which is greater than the length of the second level element 250. The third level element 350 has a planar top surface 354, and two planar bottom surface portions 356, 358. The bottom surface portion 356 is configured to mount atop the top surface 254 of the second level element 250. The bottom surface portion 358 is configured to mount atop the left side of the pad 156, as viewed in FIG. 3.

A cold water passage 361 opens downwardly through the bottom surface portion 356 and upwardly, by means of openings 361c, 363c, 365c, through the top surface 354. A hot water passage 367 opens downwardly through the bottom surface portion 356 and upwardly, by means of openings 367h, 365h, 363h through the top surface 354. An outlet passage 369 opens downwardly through the bottom surface portion 358 and upwardly through the top surface 354.

Figure 7:
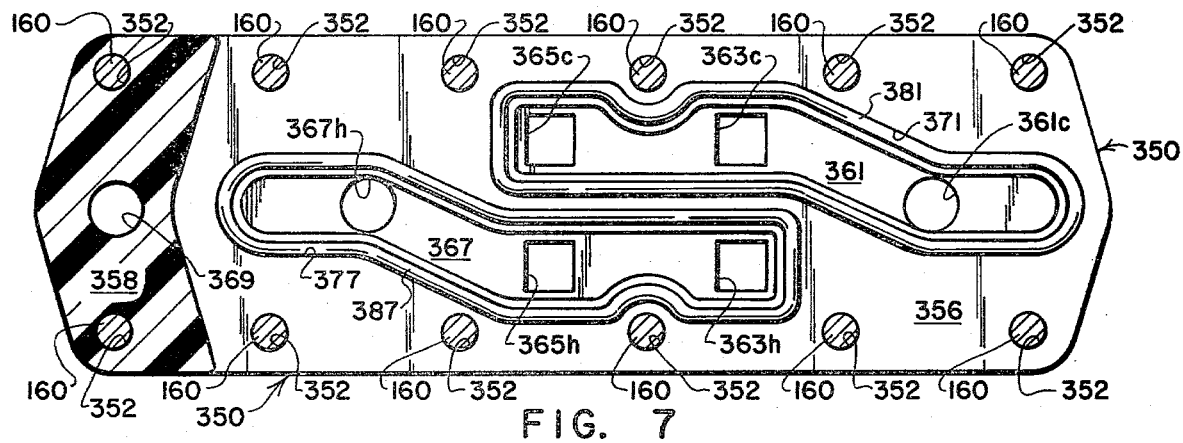
Figure 8:
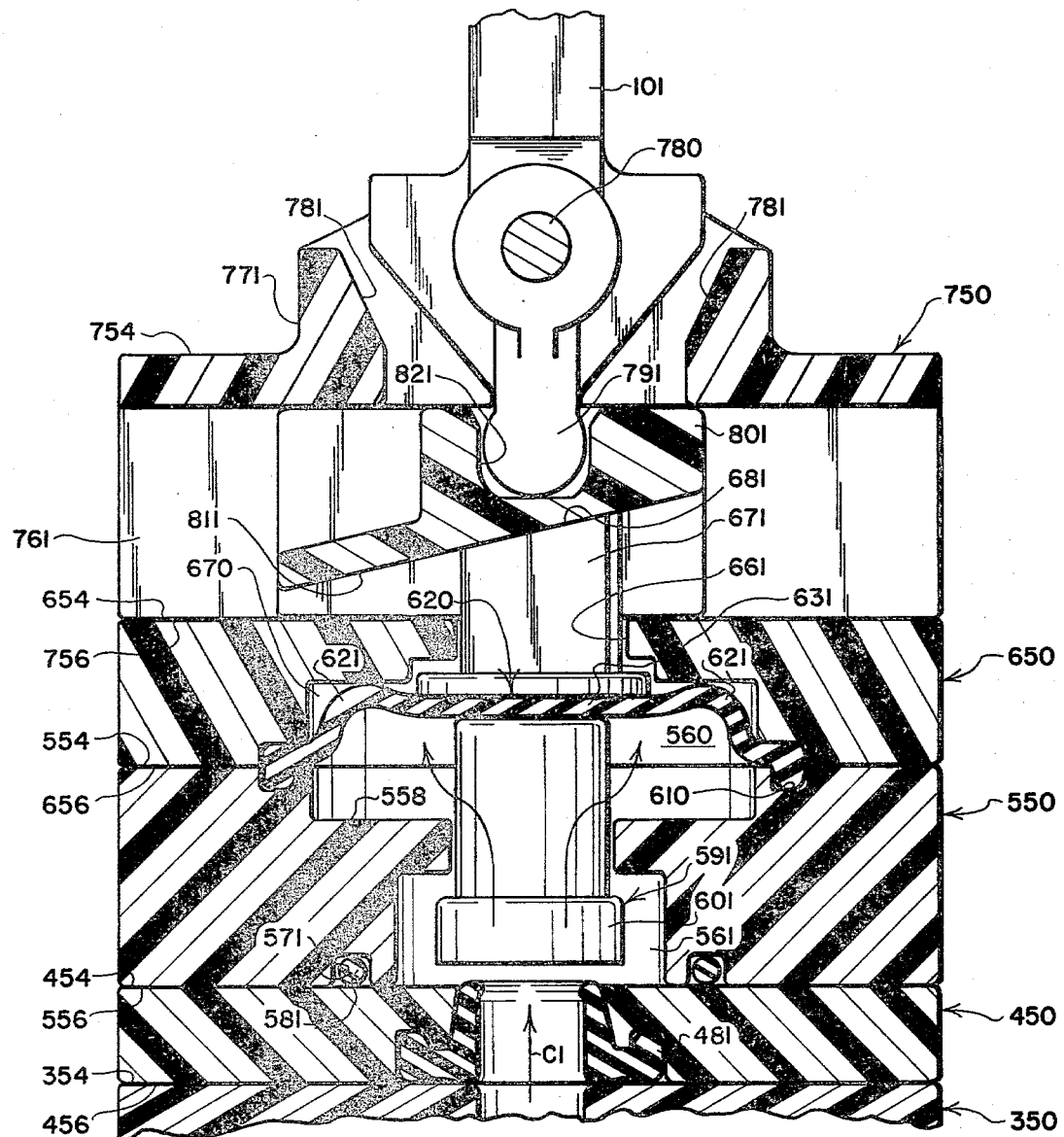
FIGS. 8 and 9 are enlarged sectional views of portions of the mixing valve as seen from planes indicated by lines 8—8 and 9—9 in FIG. 4, the operating elements in the views being shown in valve open positions.

Referring to FIG. 7, the cold water passage 361, is of generally "dog-legged" configuration in order that it may properly communicate the cold water inlet passage 261 with the unaligned cold water outlet openings 361c, 363c, 365c. Similarly, the hot water passage 367 is of "dog-legged" configuration in order that it may properly communicate the hot water inlet passage 267 with the unaligned hot water outlet openings 367h, 365h, 363h. Grooves 371, 377 are formed in the bottom surface 356 around the dog-legged passages 361, 367. O-rings 381, 387 are positioned in the grooves 371, 377 to prevent fluid leakage from between the second and third layer elements 250, 350. An annular groove 379 is formed in the bottom surface 358 surrounding the lower end of the outlet passage 369. An O-ring 389 is positioned in the groove 379 to prevent fluid leakage from between the third layer element 350 and the pad 156.

The H-shaped upper ends 323, 325 of the flow restrictor elements 303, 305 extend into the passages 361, 367 and into close proximity with the undersides of the openings 363h, 365c, respectively. By adjusting the temperature control levers 113, 115, the spaces between the upper ends 323, 325 of the flow restrictor elements 303, 305 and the lower ends of the openings 363h, 365c are controlled to adjustably restrict the flow of water from the passages 367, 361 into the openings 363h, 365c. By this arrangement, the temperature adjustment lever 113 is operative to proportion the flow rates of cold and hot water entering the passages 363c, 363h, and the lever 115 is operative to proportion the flow rates of cold and hot water entering the passages 365c, 365h.

The fourth level element 450 is of generally rectangular configuration, having a planar top surface 454 and a planar bottom surface 456. Cold and hot water passages 461c, 467h open downwardly through the bottom surface 456 and upwardly through the top surface 454. The passages 461c, 467h align with the passages 361c, 367h. Cold water passages 463c, 465c and hot water passages 463h, 465h open downwardly through the bottom surface 456 and upwardly through the top surface 454. The passages 463c, 465c align with the passages 363c, 365c. The passages 463h, 465h align with the passages 363h, 365h. An outlet passage 469 opens downwardly through the bottom surface 456 and upwardly through the top surface 454. The passage 469 aligns with the passage 369. An annular groove 479 is formed in the bottom surface 456 around the lower end of the passage 469. An O-ring 489 is positioned in the groove 479 to sealingly communicate the passages 369, 469.

Resilient seal members 481, 483c, 483h, 485c, 485h, 487 are carried in the passages 461c, 463c, 463h, 465c, 465h, 467h. Each of these seal members has an enlarged lower end which is clamped by the third and fourth level elements 350, 450 to prevent fluid leakage therebetween. Each of these seal members has an upper end which normally projects very slightly above the top surface 454 to facilitate seating engagement with an associated valve element, as will be explained.

The fifth layer element 550 is of generally rectangular configuration, having a planar top surface 554 and a planar bottom surface 556. A specially configured recess 558 is formed in the top surface 554 and defines the bottom of an outlet chamber 560. Cold and hot water passages 561c, 567h open downwardly through the bottom surface 556 in alignment with the passages 461c, 467h. The passages 561c, 567h open upwardly into the outlet chamber 560. As is best seen in FIG. 6, radially inwardly extending ears 561t, 567t are provided within the passages to form guides for receiving stems of primary valve elements 591, 597, as will be described.

A pair of mixing chambers 563, 565 are formed in the bottom surface 556 and overlie the passages 463c, 463h and 465c, 465h, respectively. A pair of restricted diameter holes 563m, 565m communicate the mixing chambers 563, 565 with the outlet chamber 560. An outlet passage 569 opens downwardly through the bottom surface 556 in alignment with the passage 469. The outlet passage 569 opens upwardly into the outlet chamber 560 to transmit liquid from the outlet chamber 560 through the aligned passages 569, 469, 369, and through the outlet port 169 into the outlet conduit 69.

Figure 6:
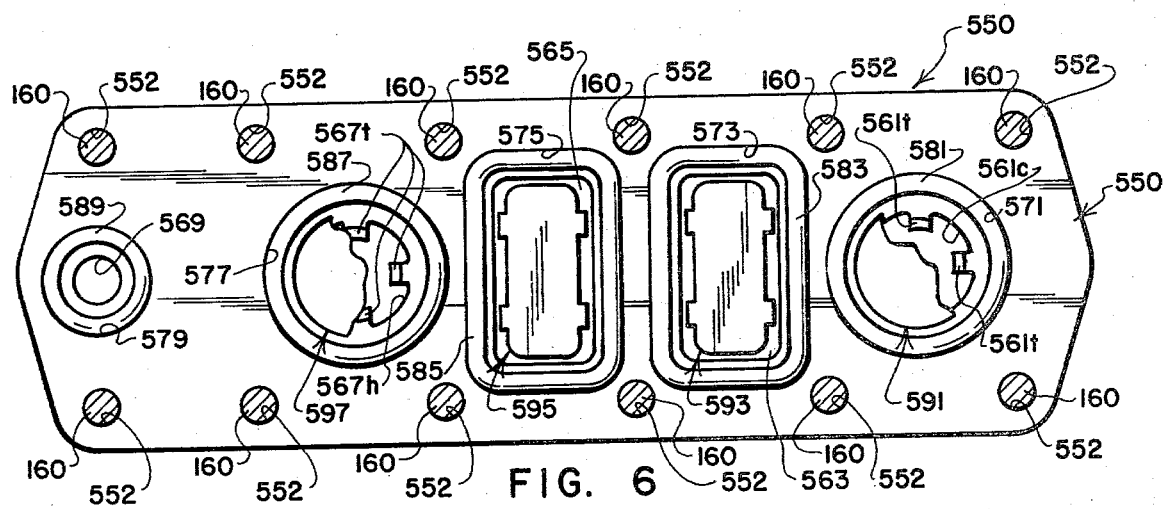

Referring to FIG. 6, annular downwardly facing grooves 571, 577 surround the lower ends of the cold and hot passages 561c, 567h. O-rings 581, 587 are carried in the grooves 571, 577 to prevent leakage between the fourth and fifth layer elements 450, 550. Generally rectangular grooves 573, 575 surround the lower ends of the mixing chambers 563, 565. O-rings 583, 585 are carried in the grooves 573, 575 to prevent leakage between the fourth and fifth layer elements 450, 550. A downwardly opening annular groove 579 is provided about the lower end of the outlet passage 569. An O-ring 589 is positioned in the groove to prevent leakage between the layer elements 450, 550.

Primary valve elements 591, 593, 595, 597 have upwardly extending stem portions which are slidingly received in the passages 561c, 563m, 565m, 567h and which project above the top surface 554. The valve elements 591, 597 have enlarged cylindrical lower end regions 601, 607 which are seatingly engageable with the upper ends of the resilient seals 481, 487. The valve elements 593, 595 have enlarged rectangular lower ends 603, 605 which are seatingly engageable with the upper ends of the resilient seals 483c, 483h and 485c, 485h, respectively.

A feature of the type of seating engagement which takes place between the valve element end regions 601, 603, 605, 607 and the seals 481, 483c, 483h, 485c, 485h, 487 is that, regardless of how much downward force may be applied to the primary valve elements 591, 593, 595, 597, the seals 481, 483c, 483h, 485c, 485h, 487 will only be compressed to such extent as is needed to bring their upper ends into coplanar relationship with the top surface 454. Stated in another way, an advantage of this construction is that the primary valve elements 591, 593, 595, 597 bottom out against the top surface 454 shortly after having made sealing engagement with the seals 481, 483c, 483h, 485c, 485h, 487, whereby seal deformation is limited and the seals are not caused to wear out due to excessive deformation during use. Still another feature of the type of sealing engagement which occurs between these seals and valve elements is that fluid pressure tends to flare the seals outwardly into increasingly firmer sealing engagement with the valve elements.

The outlet chamber 560 is bordered by a perimetrically extending, upwardly opening groove 610 formed in the top surface 554. A resilient boot 620 closes the open upper end of the outlet chamber 560 and has edge portions which extend into the groove 610. The bottom 620 has circular rib formations 621, 623, 625, 627 which surround boot portions 631, 633, 635, 637. The boot portions 631, 633, 635, 637 overlie the openings 561, 563m, 565m 567. The boot 620 has depending annular formations 643, 645 which depend from the portions 633, 635 and receive the upper end regions of the primary valve elements 593, 595. Metal rings 647 are carried in circumferentially extending grooves formed in the depending formations 643, 645 to help maintain proper operational configuration of the depending formations 643, 645.

The sixth level element 650 is of generally rectangular configuration, having a planar top surface 654 and a planar bottom surface 656. Four guide passages 661, 663, 665, 667 open upwardly through the top surface 654 and downwardly into a cavity 670 which overlies the boot 620.

Operating plungers 671, 673, 675, 677 have upwardly extending stem portions which are slidingly received in the guide passages 661, 663, 665, 667. The plungers 671, 673, 675, 677 have enlarged lower end portions which overlie the boot portions 631, 633, 635, 637 to control the positioning of the primary valve elements 591, 593, 595, 597. The plungers 671, 673, 675, 687 have upper ends 681, 683, 685, 687 which are inclined for cooperation with slide members 801, 803, 805, 807, as will be explained.

The seventh level element 750 is of generally rectangular configuration, having a top surface 754 and a bottom surface 756. Grooves 761, 763, 765, 767 are formed in the bottom surface 756. The plungers 671, 673, 675, 677 extend into the grooves 761, 763, 765, 767. Mounting formations 771, 773, 775, 777 are provided atop the top surface 754. Passages 781, 783, 785, 787 extend through the mounting formations 771, 773, 775, 777 and open into the grooves 761, 763, 765, 767.

The levers 101, 103, 105, 107 are pivotally supported on the mounting formations 771, 773, 775, 777. A metal pin 780 extends through aligned holes formed through the mounting formations 771, 773, 775, 777 and through the levers 101, 103, 105, 107, and is secured in place by a spring steel retaining clip 782. The levers 101, 103, 105, 107 have rounded depending formations 791, 793, 795, 797 which extend through the passages 781, 783, 785, 787 and into the grooves 761, 763, 765, 767.

The slide members 801, 803, 805, 807 are identical one with another, and comprise generally rectangular blocks of rigid plastics material configured to slip-fit within the grooves 761, 763, 765, 767. The slide members 801, 803, 805, 807 carry inclined downwardly facing surfaces 811, 813, 815, 817 which engage the inclined upper ends 681, 683, 685, 687 of the operating plungers 671, 673, 675, 677. The slide members 801, 803, 805, 807 have upwardly facing recesses 821, 823, 825, 827 configured to receive the rounded depending lever formations 791, 793, 795, 797.

The slide block surfaces 811, 813, 815, 817 and the plunger end surfaces 681, 683, 685, 687 are inclined at equal degrees to provide good surface-to-surface frictional contact between each of the plunger end surfaces and its associated inclined slide block surface. An inclination angle of about 13 degrees is preferred. Such an arrangement enables the slide blocks 801, 803, 805, 807 to be moved easily by finger operation of the levers 101, 103, 105, 107, but prevents force feedback from the plungers 671, 673, 675, 677 causing unwanted displacement of the slide blocks 801, 803, 805, 807.

MAINTAINENCE OF PROPER MIXING CHAMBER BACK PRESSURE

While the foregoing description sets forth the basic configurations and arrangements of valve operating elements utilized in the preferred practice of the invention, a proper disclosure of the nature of certain of these elements would not be complete without discussing in greater detail the type of coordinated control they provide over flows of fluid into and out of the mixing chambers 563, 565. For purposes of this discussion, reference will be made to FIG. 9 wherein the primary valve element 593 is shown in an open position, and to FIG. 10 wherein the valve element 593 is shown in its closed position. Since the valve elements 593, 595 operate identically in response to movements of their control levers 103, 105, only the operation of the valve element 593 will be discussed.

Figure 10:
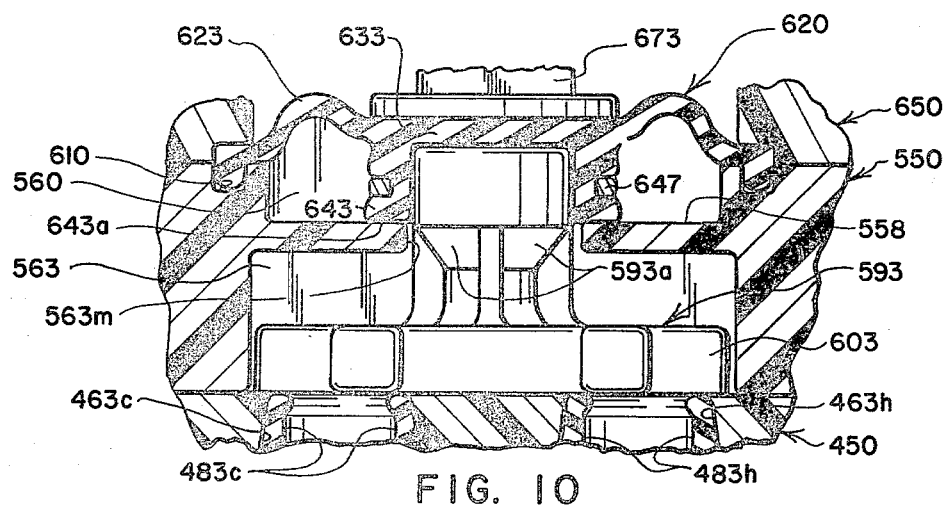
FIG. 10 is a sectional view similar to FIG. 9 with the operating elements being shown in valve closed positions; and, FIGS. 11 and 12 are sectional views similar to FIG. 10 showing alternate, less preferred embodiments of valve operating elements.

In FIG. 10, the primary valve element 593 has its lower end 603 in seating engagement with the upper ends of the resilient seals 483c, 483h. By this arrangement, flow through the passages 463c, 463h is closed off and no flows of cold or hot water from the inlets 21, 27 are admitted to the mixing chamber 563.

Also in FIG. 10, it will be seen that flow of mixed fluid out of the mixing chamber 563 is entirely closed off. The depending boot portion 643 has a bottom surface 643a which is compressed firmly into engagement with the recess surface 558, and the area of sealing engagement thereby established between the surfaces 643a, 558 extends perimetrically about the hole 543m.

As will be noted through a careful comparison of the cross-sectional configurations of the depending portion 643 in FIGS. 9 and 10, when the plunger 673 applies force to the boot portion 633 to force the primary valve element 593 into seating engagement with the seals 483c, 483h, the depending portion 643 is compressed so firmly into engagement with the surface 558 as to cause a slight "bulging" deformation about the region of the metal reinforcing ring 647. The metal reinforcing ring 647 helps restrain this deformation and tends to prolong the effective operating life of the boot 620.

The sealing engagement which is established between the surfaces 643a, 558 as the plunger 673 depresses the boot portion 633 to close the primary value element 593 against the seals 483c, 483h does not occur simultaneously with the closing of the inlet passages 463c, 463h. Stated in another way, the closing off of the flow of mixed fluid out of the mixing chamber 563 does not occur simultaneously with the closing off of the flows of cold and hot fluid into the mixing chamber 563. As the plunger 673 depresses the boot portion 633, the surfaces 643a, 558 sealingly engage before the primary valve element 593 sealingly engages the seals 483c, 483h. Accordingly, mixing chamber outflow is fully closed off before mixing chamber inflow is fully closed off.

Similarly, when the plunger 673 is raised by water pressure to permit opening movement of the primary valve element 593, the sealing engagement between the surfaces 643a, 558 is not disrupted simultaneously with the opening of the inlet passages 463c, 463h. Stated in another way, the establishment of a flow of mixed fluid out of the mixing chamber 563 does not occur simultaneously with the establishment of flows of cold and hot fluid into the mixing chamber 563. As the plunger 673 is raised, the compression of the depending boot portion 643 is progressively relieved but causes the sealing engagement between the surfaces 643a, 558 to be maintained until after the primary valve element 593 has lifted out of sealing engagement with the seals 483c, 483h. Accordingly, mixing chamber outflow remains fully closed off for at least a brief interval of time after mixing chamber inflow has been established.

Coordinating the control of mixing chamber inflow and outflow to provide this type of time delay is found to enhance the capability of the valve cartridge 100 to maintain constant the temperature of the mixed flow of fluid delivered from the mixing chamber 563 to the outlet chamber 560. Time delayed opening of the mixing chamber outlet tends to permit fluid pressure within the mixing chamber 563 to equalize with the pressures of the inflowing fluids before a mixed fluid flow is permitted to discharge from the mixing chamber 563. A more stable control over the temperature of the delivered mixed flow is found to result through utilization of this design approach.

Still another factor which is found to enhance the capability of the valve cartridge 100 to maintain constant temperature of the mixed flow of fluid delivered from the mixing chamber 563 lies in coordinating the relative cross-sectional areas of the mixing chamber's inflowing and outflowing fluids. As the primary valve element 593 moves progressively further away from the seals 483c, 483h, the combined cross-sectional areas of the inflowing fluids increases quite rapidly from a condition where inflow is fully closed off to a condition where inflow is largely unrestricted. Accordingly, as the primary valve element 593 opens the inflow ports, the fluid pressure within the mixing chamber 563 very rapidly equalizes itself with the pressure of the inflowing fluids.

In contrast, as the primary valve element 593 and the depending boot portion 643 are raised to permit fluid outflow from the mixing chamber 563, the type of outflow which is permitted is relatively restricted in character. The outflow is not so restricted as to inhibit the capacity of the valve cartridge 100 to deliver an adequate supply of water, but is restricted to such a degree that only a very slight pressure drop tends to be experienced as fluid discharges from the mixing chamber 563 into the outlet chamber. Stated in another way, a slight degree of "back pressure" is maintained in the mixing chamber under all flow conditions to assure that the pressure in the mixing chamber 563 equalizes itself as fully as possible with the pressure of the fluids flowing into the mixing chamber. A more stable control over the temperature of the delivered mixed flow is found to result through utilization of this design approach.

A further design feature which contributes to the capability of the valve cartridge 100 to properly coordinate mixing chamber inflow and outflow lies in the provision of tapered undercut surface portions 593a on the stem of the primary valve element 593. The surface portions 593a cooperate with the walls of the opening 643m to assist in metering the flow of fluid delivered from the mixing chamber 563 to the outlet chamber 560. As the primary valve element 593 is raised, a progressively larger outlet flow area is provided between the surface portions 593a and the walls of the opening 643m.

In summary, one important feature of mixing valves embodying the preferred practice of the present invention lies in the provision of a lost-motion or time delay control to coordinate the closings and openings of flow into and out of the valve's mixing chamber or chambers. Still another important feature of mixing valves embodying the preferred practice of the present invention lies in the provision of a system for coordinating the relative degrees of openings of the mixing chamber's inlets and outlet. Both of these features enhance maintainence of proper mixing chamber back pressure. Both are found to enhance the capability of a mixing valve to maintain constant mixed flow delivery temperature throughout a range of available flow rates.

Where these features are present in a mixing valve of the type described, either of the control levers 103, 105 may be moved back and forth through its full range of travel to vary delivery rate of a mixed flow from a meager trickle to full flow, and (assuming that the temperatures and pressures of the cold and hot water supplied to the inlets 21, 27 remain constant) it will be found that the temperature of the mixed flow remains constant to a very surprising degree. The capability of such a valve to maintain constant delivery temperature of a mixed flow throughout the valve's full range of available delivery rates is improved even over valves of the type described in the referenced Mixing Valve Patent.

Additional features of valves embodying the preferred practice of the present invention will be apparent from a careful review of the drawings. By way of example, a number of the holes formed through certain ones of the layer elements are square as opposed to round. In some instances, square holes are used simply to maximize passage cross-section in the space available. In other instances, square or specially configured holes are used to act as guides for movable elements which need to be held in proper orientation without being permitted to rotate. Other features which need not be described are likewise illustrated in the drawings.

FUNCTIONAL ARRANGEMENT OF VALVE "STAGES"

Referring to FIG. 2, the first, second and third level elements 150, 250, 350 and their associated relatively movable parts may be thought of as cooperating to define a "first stage" wherein the following functions are performed. First a supply of cold water (arrow C) is divided into three parallel flow paths (arrows C1, C3, C5), two of these flows (arrows C1, C3) being substantially unrestricted and the third (arrow C5) being adjustably restricted. Second, a supply of hot water (arrow H) is divided into three parallel flow paths (arrows H7, H5, H3), two of these flows (arrows H7, H5) being substantially unrestricted, and the third (arrow H3) being adjustably restricted. Third, an outlet flow passage (arrow D) is defined, communicating with the outlet conduit 69.

The fourth and fifth level elements 450, 550 and their associated relatively movable parts may be thought of as cooperating to define a "second stage" wherein the following functions are performed. First, the flow of cold water (arrow C1) is selectively closed off or passed to the outlet chamber 560 by the primary valve element 591. Second, the flow of hot water (arrow H1) is selectively closed off or passed to the outlet chamber 560 by the primary valve element 597. Third, proportioned flows of cold and hot water from the passages 363c, 363h (arrows C3, H3) are selectively closed off or admitted to the mixing chamber 563 by the primary valve elements 593. Lastly, proportioned flows of cold and hot water from the passages 365c, 365h (arrows C5, H5) are selectively closed off or admitted to the mixing chamber 565 by the primary valve element 595.

The fifth level element 550, the primary valve elements 593, 595, and the boot 620 may be thought of as cooperating to define a "third stage" wherein the following two functions are performed. First, lukewarm water from the mixing chamber 563 (arrow M3) is selectively closed off or passed to the outlet chamber 560 by the depending boot portion 643 which functions as a "secondary" valve element. Second, warm water from the mixing chamber 565 (arrow M5) is selectively closed off or passed to the outlet chamber 560 by the depending boot portion 645 which likewise functions as a "secondary" valve element.

The fifth and sixth level elements 550, 650 and their associated relatively movable parts may be thought of as defining a "fourth stage" wherein the outlet chamber 560 is defined.

As will be appreciated, the assembled stacked array of layer elements defining the cartridge 100 positions the first, second, third and fourth "stages" in a stacked or series relationship providing a compact, easy to assemble unit.

ASSEMBLY

The elements of the valve cartridge 100 are preferably assembled independently of the structure 20. It is preferred that the assembled cartridge 100 be mounted on the structure 20 only at final assembly of the faucet 10, either in the factory or at the installation site.

The components of the cartridge 100 are preferably assembled essentially through a stacking technique. Beginning with the second layer element 250, and then progressing successively to each of the other layer elements 350-750, the seals and other described operating elements are positioned as has been described to form the described stacked array. Once assembled, the various layer elements may then be permanently welded together, if desired, using ultrasonic techniques or suitable bonding agents. Alternatively conventional fasteners such as rivets (not shown) may be used to maintain the unitary integrity of the cartridge 100.

OPERATION

It will be assumed that cold and hot water supply connections (not shown) have been made with the inlets 21, 27, and that the levers 101, 103, 105, 107 have been pivoted to positions where the plungers 671, 673, 675, 677 are forced fully downwardly by the slide members 801, 803, 805, 807, whereby the primary valve elements 591, 593, 595, 597 are sealingly engaging the seals 481, 483c, 483h, 485c, 485h, 487 to shut off all flow through the faucet assembly 10. It will further be assumed that the sources of pressurized cold and hot water which are supplying the inlets 21, 27 provide water at constant temperatures, and that the supply pressures of hot and cold water are equal and remain constant. A typical cold water supply temperature found in many homes is about 40° F. (about 5° C.). A typical hot water supply temperature is about 150° F. (about 65° C.).

The temperature control levers 113, 115 may be positioned prior to or during operation of the faucet assembly 10 to adjust the delivery temperatures of mixed flows provided through the selective operation of the levers 103, 105. Pivoting the levers 113, 115 to move the flow restrictor members 303, 305 upwardly into the channels 367, 361 will diminish the flow rates of water supplied to the openings 363h, 365c. Pivoting the levers 113, 115 to move the flow restrictor members 303, 305 downwardly will increase the flow rates of water supplied to the openings 363h, 365c.

In preferred practice, the flow restrictor element 303 is configured to provide for adjustable proportioning of the ratio of cold to hot flows admitted to the mixing chamber 563 so that a "lukewarm" mixed flow output within the range of about 50° F. (about 10° C.) to about 100° F. (about 40° C.) can be supplied through operation of the lever 103. In preferred practice, the flow restrictor element 325 is configured to provide for adjustable proportioning of the ratio of cold to hot flows admitted to the mixing chamber 565 so that a "warm" mixed flow output within the range of about 90° F. (about 35° C.) to about 140° F. (about 60° C.) can be supplied through operation of the lever 105.

If cold water at supply temperature is desired, the lever 101 can be pivoted to permit movement of the primary valve member 591 out of its closed position, whereby cold water will flow through the passage 561 into the output chamber 560 for discharge through the conduit 69 to the spout 29. The degree to which the lever 101 is pivoted will control the degree of "opening" of the primary valve member 591, and will thereby control the rate of flow at which cold water is delivered to the spout 29. When delivery is to be terminated, the lever 101 is pivoted forwardly to return the primary valve member 591 to a position of seating engagement with the seal 481. If hot water at supply temperature is desired, the lever 107 is operated in the same manner.

If water at a lukewarm temperature intermediate that of the cold and hot supply temperatures is desired, the lever 103 is pivoted rearwardly, whereupon flow into and through the mixing chamber 563 is initiated in a controlled manner. As the plunger 673 diminishes its downward application of force on the boot portion 633, the boot portion 633 begins to rise, as does the primary valve element 593. Due to the fact that the depending boot formation 643 is still compressed, it continues to remain in sealing engagement with the surface while the primary valve member 593 ceases to sealingly engage the seals 483c, 483h, and thereby opens to permit cold and hot flows through the seals 483c, 483h into the mixing chamber 563. The degree to which the lever 103 is pivoted rearwardly will control the rate of flow at which intermediate temperature water is delivered to the spout 29. When delivery is to be terminated, the lever 103 is pivoted forwardly to a position where the secondary valve member or boot portion 643 closes off flow from the mixing chamber 563, and, thereafter, to a fully closed position where the primary valve member 593 closes off flow into the mixing chamber 563.

If water at a warm temperature intermediate that of the cold and hot supply temperatures is desired, the lever 105 is operated in the same manner described in conjunction with the operation of lever 103.

ALTERNATE EMBODIMENTS

Figure 11:
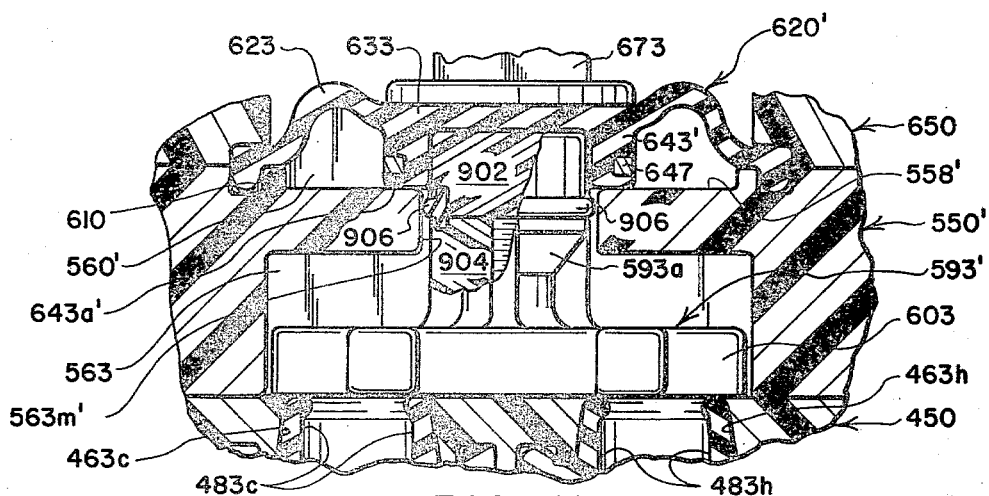

An alternative embodiment of the invention is shown in FIG. 11. Since a majority of the components of this embodiment find similar, if not identical, counterparts in the previously described embodiment, the same reference numerals as used previously are used once again where appropriate. Where the reference numerals used in FIG. 11 are exactly the same as numerals used in FIGS. 1-10, these numerals refer to parts or features of exactly identical construction to those described previously. Where reference numerals used in FIG. 11 bear a "prime" mark, they refer to parts or features which correspond to, but which are somewhat differently configured, than those described previously. Where entirely new reference numerals are used in FIG. 11, these newly adopted numerals refer to entirely new parts or features. This system of using identical and corresponding reference numerals is also adhered to in conjunction with still another alternate embodiment illustrated in FIG. 12, where some numerals bearing "double-prime" marks are employed.

The embodiment of FIG. 11 differs from that of FIG. 10 in its provision of a slightly modified primary valve element 593', a slightly modified boot 620', and a slightly modified level element 550'.

The valve element 593' differs in that its upstanding stem is formed from two threadingly interconnected parts 902, 904 which sandwich a conventional resilient T-ring 906. The boot 620' differs in that its depending portion 643' is shorter and is not intended to be deformably compressed when in its valve closed position. The level element 550' is thicker and provides a taller passage wall 643m' which is sealingly engaged by the T-ring 906.

The embodiment of FIG. 11 operates substantially the same as the earlier described embodiment except that the T-ring 906 performs the function of a secondary valve element and provides the desired lost-motion or time delay system for maintaining mixing chamber back pressure as close as possible to that of the supply pressure.

Figure 12:
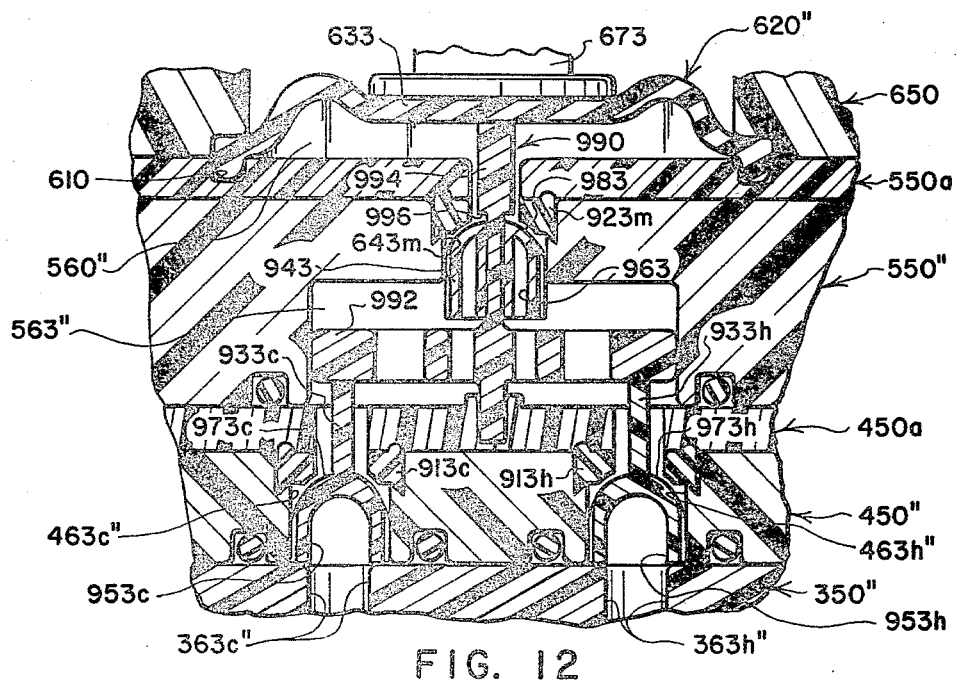

The embodiment of FIG. 12 differs considerably from the embodiments described earlier, in that the primary and secondary valve elements it employs to control admission to and discharge from a mixing chamber 563" are biased toward closed positions by the pressure of incoming fluid.

The embodiment of FIG. 12 includes modified layer elements 350", 450", 550" and added spacer elements 450a, 550a. Resilient seals 913c, 913h are provided near the junctures of the elements 450", 450a within inlet passages 463c", 463h". A resilient seal 923m is provided near the junctures of the elements 550", 550a within an outlet passage 643m".

Primary valve elements 933c, 933h are movably carried in the inlet passages 463c", 463h". A secondary valve element 943 is movably carried in the outlet passage 643m". The valve elements 933c, 933h, 943 have concave lower portions 953c, 953h, 963 which face toward incoming fluid flow, and convex upper portions 973c, 973h, 983 which are seatable against the seals 913c, 913h, 923m.

A lost-motion actuator system 990 interconnects the primary and secondary valve elements 933c, 933h, 943 to assure that the primary valve elements 933c, 933h will open prior to the opening of the secondary valve element 943. The system 990 includes a pressure plate 992 which engages the upper ends of the primary valve elements 933c, 933h and an upstanding post 994 which extends through and movably carries the secondary valve element 943. The post 994 has a downwardly facing shoulder 996 configured to engage the top of the secondary valve element 943 when the post 994 is depressed by the boot 620". The shoulder 996 is positioned such that it will not engage and open the secondary valve element 943 until after the pressure plate 992 has caused the primary valve elements 933c, 933h to open. As will be apparent, this type of lost-motion or time delay system provides the same general type of control of mixing chamber inflow and outflow as results through the use of the other described embodiments. All of the described embodiments seek to maintain mixing chamber back pressure as close as possible to that of the pressure of cold and hot water flows supplied to the faucet assembly 10.

As will be appreciated from the foregoing description, valves embodying principles of the present invention are extremely long-lived. The individual layer elements forming the cartridge 100 can be molded from an inexpensive plastic material and can be assembled quite easily by being stacked atop each other. The expense of the valve cartridge 100 is quite modest. Because the cartridge 100 is connected to the support structure 20 by only six pairs of fasteners 160, the entire valve cartridge 100 can be replaced as a unit with little difficulty. The components of the valve cartridge 100 are sufficiently inexpensive that a malfunctioning valve cartridge can simply be disposed of and replaced by a new cartridge.

Although the invention has been described in its preferred form with a certain degree of particularity, it is understood that the present disclosure of the preferred embodiment has been made only by way of example and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. A valving arrangement for controlling flows of first and second fluids to a mixed flow path to provide a mixed flow along the mixed flow path at a rate varied in response to the setting of a single valve control, the proportion of the first and second fluids in the mixed flow being substantially constant at all delivery rates, comprising:

(a) a controlled first fluid port and a controlled second fluid port respectively opening to a mixed flow path;

(b) a valve control movable between valve closed and valve full open positions;

(c) primary valving means movable relative to the first and second ports between a position closing the ports and a position simultaneously opening the ports, the primary valving means simultaneously opening and increasing the opening of the ports in response to movement of the valve control from its valve closed to its valve full open positions, and the primary valving means simultaneously diminishing the opening of and closing the ports in response to movement of the valve control toward and to its valve closed position; and, (d) flow control means located downstream from the first and second ports along the mixed flow path and controlled by the valve control for:
  (i) reducing the flow area of the mixed flow path and thereby diminishing the flow of mixed fluid along the mixed flow path as the valve control moves the primary valving means toward a position closing the first and second ports;
  (ii) closing off flow along the mixed flow path prior to the time when the primary valving means closes the first and second ports, and maintaining closure of the mixed flow path during the time when the primary valving means moves to and remains in a position closing the first and second ports;
  (iii) maintaining closure of the mixed flow path during initial movement of the valve control from its closed position and until after a time when the primary valving means has opened the first and second ports; and,
  (iv) increasing the flow area of the mixed flow path as the valve control moves the primary valving means to increase the opening of the ports.

2. The valving arrangement of claim 1 wherein the mixed flow control comprises:
(a) structure defining a mixed flow port located along the mixed flow path;
(b) secondary valving means movable relative to the mixed flow port between positions closing and opening the mixed flow port, the secondary valving means being movable in response to movement of the valve control to:
  (i) progressively diminish the opening of the mixed flow port as the valve control moves the primary valving means toward a position closing the first and second ports;
  (ii) close the mixed flow port prior to the time when the primary valving means closes the first and second ports, and maintain closure of the mixed flow port during the time when the primary valving means moves to and remains in a position closing the first and second ports;
  (iii) maintain closure of the mixed flow port during initial movement of the valve control from its closed position and until after a time when the primary valving means has opened the first and second ports; and,
  (iv) progressively increase the opening of the mixed flow port as the valve control moves the primary valving means to increase the opening of the first and second ports.

3. The valving arrangement of claim 2 wherein the secondary valving means comprises:
(a) a resilient member having a valving portion engagable with the mixed flow port; and,
(b) plunger means for moving the resilient member in response to movement of the valve control.

4. The valving arrangement of claim 3 wherein:
(a) the valving portion includes a resilient tubular part having an end surface which is brought into surrounding relationship with the mixed flow port when the valving portion closes the mixed flow port; and,
(b) the plunger means is operative to:
  (i) compress and progressively increase compression of the resilient tubular part at a time after the valving portion has closed the mixed flow port and as the primary valving means moves to close the first and second ports;
  (ii) maintain compression of the resilient tubular part while the primary valving means closes the first and second ports; and,
  (iii) progressively diminish compression of the valving portion as the primary valving means moves away from the first and second ports to initially open the first and second ports;
(c) whereby the compression of the tubular part provides a delayed opening of the mixed flow port following opening of the first and second ports during movement of the valve control to its full open position.

5. The valving arrangement of claim 4 additionally including a relatively rigid reinforcing member carried on and perimetrically surrounding an outer portion of the resilient tubular part to enhance the longevity of the resilient tubular part during repeated cycles of compression.

6. The valving arrangement of claim 2 wherein the secondary valving means comprises:
(a) valving member movable between positions closing and opening the mixed flow port; and,
(b) means establishing a lost-motion connection between the valving member and the valve control for effecting a delayed opening of the mixed flow port following opening of the first and second ports.

7. The valving arrangement of claim 2 wherein the primary valving means and the secondary valving means are included as part of a common structure.

8. The valving arrangement of claim 7 wherein that portion of the common structure defining the secondary valving means comprises:
(a) a projection extending from the primary valving means and through the mixed flow port; and,
(b) sealing means carried by the projection.

9. The valving arrangement of claim 8 wherein the sealing means comprises a resilient ring disposed circumferentially about the projection, the ring being operative to engage the mixed flow port to close off flow through the mixed flow port.

10. In a mixing valve of the type having a single settable control for regulating not only the flows of first and second fluids to a mixing chamber but also the flow of mixed fluid from the mixing chamber, the improvement of a system for maintaining substantially constant the relative proportion of the first and second fluids in the mixed flow, comprising:
(a) structure defining a mixing chamber;
(b) a first port for admitting a first fluid to the mixing chamber;
(c) a second port for admitting a second fluid to the mixing chamber;
(d) a mixed flow port for discharging mixed fluid from the mixing chamber;
(e) a valve control movable between valve closed and valve full open positions;
(f) primary valving means movable relative to the first and second ports between a position closing the ports and a position simultaneously opening the ports, the primary valving means simultaneously opening and increasing the opening of the ports in response to movement of the valve control from its valve closed to its valve full open positions, and the primary valving means simultaneously diminishing the opening of and closing the ports in response to movement of the valve control toward and to its valve closed position; and, (g) secondary valving means being movable in response to movement of the valve control to:
  (i) progressively diminish the opening of the mixed flow port as the valve control moves the primary valving means toward a position closing the first and second ports;
  (ii) close the mixed flow port prior to the time when the primary valving means closes the first and second ports, and maintain closure of the mixed flow port during the time when the primary valving means moves to and remains in a position closing the first and second ports;
  (iii) maintain closure of the mixed flow port during initial movement of the valve control from its closed position and until after a time when the primary valving means has opened the first and second ports; and,
  (iv) progressively increase the opening of the mixed flow port as the valve control moves the primary valving means to increase the opening of the first and second ports.

11. The mixing valve of claim 10 wherein the secondary valving means includes a resilient member having a valving portion which is movable between positions closing and opening the mixed flow port, and plunger means for moving the resilient member toward and into a position closing the mixed flow port in response to movement of the valve control away from its valve full open position.

12. The mixing valve of claim 10 wherein the secondary valving means includes a valving member which is movable between positions closing and opening the mixed flow port, and means establishing the lost-motion connection between the valving member and valve control for effecting a delayed opening of the mixed flow port following opening of the first and second ports.

13. The mixing valve of claim 10 wherein:
(a) the primary valving means and the secondary valving means include primary and secondary formations provided at spaced locations on a common member;
(b) the secondary formation is configured to remain in closing relationship with the mixed flow port not only during closure of the first and second ports by the primary formations but also while the primary formation is within a selected small distance of the first and second ports; and,
(c) whereby the secondary formation provides a delayed opening of the mixed flow port following opening of the first and second ports during movement of the valve control to its full open position.

14. A mixing valve for mixing first and second flows of fluids to deliver a mixed flow wherein the proportion of the first and second fluids in the mixed flow is maintained substantially constant at all mixed flow delivery rates, comprising:
(a) a base structure;
(b) housing means mountable on the base structure and defining:
  (i) a mixing chamber;
  (ii) first and second passages opening into the mixing chamber for directing flows of first and second fluids, respectively, into the mixing chamber;
  (iii) a mixed flow passage communicating with the mixing chamber for delivering a mixed flow of the first and second fluids from the mixing chamber;
(c) primary valving means carried by the housing means for movement between a closed position closing off flow through the first and second passages, and a full open position simultaneously permitting substantially unrestricted flow of the first and second fluids through the first and second passages, the primary valving means being operable to simultaneously permit increased flow through the first and second passages as the primary valving means moves from its closed position to its full open position;
(d) secondary valving means carried by the housing means for movement between a closed position closing off flow through the mixed flow passage and a restricted open position permitting a somewhat restricted flow of mixed fluid through the mixed flow passage, the secondary valving means being operable to permit increased flow through the mixed flow passage as the secondary valving means moves from its closed position to its restricted open position; and,
(e) control means operably connected to the primary and to the secondary valving means for:
  (i) moving the primary valving means to initiate flow in the first and second passages prior to moving the secondary valving means to initiate flow in the mixed flow passage whereby mixed fluid pressure corresponding to the pressures in the first and second passages is established within the mixing chamber prior to the establishment of flow through the mixed flow passage;
  (ii) moving the primary and secondary valving means in concert after flows have been established in the first, second and mixed flow passages, the primary and secondary valving means being positioned during such movement to provide a somewhat more restricted flow of mixed fluid out of the mixing chamber than is encountered by the combined flows of the first and second fluids into the mixing chamber, whereby fluid pressure within the mixing chamber continues to correspond with the pressures in the first and second passages; and,
  (iii) moving the secondary valving means to close off flow through the mixed fluid passage prior to moving the primary valving means to simultaneously close off flow in the first and second passages.

15. The mixing valve of claim 14 wherein:
(a) the housing means is formed from a plurality of relatively thin layer elements arranged in a stacked array;
(b) certain of the layer elements define the first and second passages and one part of the mixing chamber;
(c) other of the layer elements define the mixed flow passages and the remainder of the mixing chamber; and,
(d) the primary valving means comprises a valving member housed at least in part within the mixing chamber.

16. The mixing valve of claim 15 wherein:

(a) the first and second passages are defined, at least in part, by a pair of resilient members carried in holes formed through a selected layer element;
(b) the selected layer element has a surface which defines a wall of the mixing chamber;
(c) the holes formed through the selected layer element open through the wall;
(d) the valving member is adapted to engage the wall in areas surrounding the holes; and,
(e) the resilient members have sealing portions lining the areas and normally extending a small distance into the mixing chamber; and
(f) the valving member sealing engages the sealing portions and compresses the resilient members as the valving member moves into engagement with areas surrounding the holes, the degree to which the resilient members are compressed being limited by the engagement of the valving member with the areas.

17. The mixing valve of claim 14 wherein the housing means defines a replaceable cartridge removably mounted on the base structure.

18. A valve for mixing first and second flows of fluids to produce a mixed flow, the proportion of fluids in the mixed flow being substantially constant at all delivery rates, comprising:
(a) structure defining a mixing chamber;
(b) first and second inlets for admitting first and second fluid flows to the mixing chamber;
(c) an outlet for delivering a mixed fluid flow from the mixing chamber;
(d) first valve element means for controlling the admission of first fluid flow through the first inlet to the mixing chamber;
(e) second valve element means for controlling the admission of second fluid flow through the second inlet to the mixing chamber;
(f) outlet valve element means for controlling the delivery of mixed fluid through the outlet from the mixing chamber; and,
(g) control means for interconnecting the first, second and outlet valve element means to effect movement of the first, second and outlet valve means in concert to control flow to and from the mixing chamber in such a manner as will provide more of a restriction to outlet flow than is provided to inlet flow, whereby during such time as flow is permitted through the outlet, fluid pressure within the mixing chamber is maintained at a pressure corresponding to that of the flows entering the inlets.

19. The valve of claim 18 wherein a common structure connects the first and second valve element means for concurrent movement.

20. The valve of claim 19 wherein the first and second valve element means comprise different portions of a common valve element, and the connecting structure has a stem portion which projects from the valve element means toward the mixing chamber outlet.

21. The valve of claim 20 wherein the connecting structure engages a portion of the outlet valve element means.

22. The valve of claim 18 wherein the first and second valve element means are independent structures connected to a common actuator element.

23. The valve of claim 22 wherein the first, second and outlet valve element means comprise cuplike members, the cuplike members being positioned such that their concave portions open in the direction of highest fluid pressure and their convex portions provide a valve seating function.

24. The valve of claim 23 wherein the actuator element for the first and second valve element means also actuates the outlet valve element means, the actuator including a lost-motion connection permitting the outlet valve element means to be opened only after the first and second valve element means have been opened, whereby the first and second fluids are thoroughly mixed in the mixing chamber before discharge through the outlet.

25. The valve of claim 18 further comprising adjustable flow restrictor means disposed upstream of the mixing chamber for adjustably proportioning the relative rates of flow of the first and second fluids supplied to the mixing chamber.

26. The valve of claim 25 wherein the flow restrictor means includes a flow restrictor element which is moved by a cam surface.

27. The valve of claim 26 additionally including a lever mounted on the base structure for pivotal movement, the cam surface being carried by the lever for movement therewith relative to the flow restrictor element.

28. A valve for delivering cold water, hot water, or water at an intermediate temperature, comprising:
(a) base means unto which separate flows of hot water and cold water are supplied, the base means being operable to direct the cold water along a first flow path and the hot water along a second flow path;
(b) housing means secured to the base means, the housing means defining a cold water chamber in communication with the first flow path, a hot water chamber in communication with the second flow path and a mixing chamber in communication with both the first and second flow paths;
(c) the housing means additionally defining an outlet chamber in communication with the cold and hot water chambers, and a mixed flow port defining a mixed flow path communicating the mixing chamber and the outlet chamber;
(d) flow restriction means disposed upstream of the mixing chamber in one of the first and second flow paths to proportion the relative flow rates of cold and hot water admitted to the mixing chamber;
(e) a plurality of valve elements disposed in the first, second and mixed flow paths, the valve elements being individually movable from a closed position where no waterflow can occur to an open position where waterflow is permitted, comprising:
 (i) a cold water valve element controlling the flow of cold water along the first flow path to the cold water chamber;
 (ii) a hot water valve element controlling the flow of hot water along the second flow path to the hot water chamber;
 (iii) a mixing chamber inlet valve element controlling flows of cold and hot water along the respective first and second flow paths to the mixing chamber; and,
 (iv) a mixing chamber outlet valve element controlling flow along the mixed flow path from the mixing chamber to the outlet chamber.

29. The valve of claim 28 additionally including:
(a) a first actuator for operating the cold water valve element;

(b) a second actuator for operating the hot water valve element; and (c) a third actuator for operating the mixing chamber valve elements.

30. The valve of claim 29 further comprising a time delay mechanism for delaying opening of the mixing chamber outlet valve element until after opening of the mixing chamber inlet valve element.

31. The valve of claim 30 wherein the outlet chamber valve element is operative to restrict flow from the mixing chamber to the outlet chamber, the degree of such flow restriction being greater than any restriction provided by the mixing chamber inlet valve to the flow of cold and hot water entering the mixing chamber.

32. The valve of claim 30 wherein the time delay mechanism comprises a lost-motion connection between the mixing chamber outlet valve element and the mixing chamber inlet valve element, the lost-motion connection permitting the mixing chamber inlet valve element to be opened a predetermined extent prior to initial opening of the mixing chamber outlet valve element, whereby water entering the mixing chamber is thoroughly mixed before the mixing chamber outlet valve element is opened.

* * * * *